US008971269B2

(12) United States Patent
Yu et al.

(10) Patent No.: US 8,971,269 B2
(45) Date of Patent: *Mar. 3, 2015

(54) UPLINK CONTROL SIGNAL DESIGN FOR WIRELESS SYSTEM

(75) Inventors: Dong-Sheng Yu, Ottawa (CA); Hosein Nikopourdeilami, Stittsville (CA); Mo-Han Fong, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 11 days.

This patent is subject to a terminal disclaimer.

(21) Appl. No.: 13/620,418

(22) Filed: Sep. 14, 2012

(65) Prior Publication Data
US 2013/0016679 A1 Jan. 17, 2013

Related U.S. Application Data

(63) Continuation of application No. 12/806,193, filed on Sep. 2, 2009, now Pat. No. 8,761,151.

(60) Provisional application No. 61/094,644, filed on Sep. 5, 2008.

(51) Int. Cl.
H04W 4/00 (2009.01)
H04W 72/04 (2009.01)
H04W 72/02 (2009.01)

(52) U.S. Cl.
CPC .......... *H04W 72/0453* (2013.01); *H04W 72/02* (2013.01)
USPC ........................................ 370/329

(58) Field of Classification Search
None
See application file for complete search history.

(56) References Cited

U.S. PATENT DOCUMENTS

| 7,986,959 | B2 | 7/2011 | Malladi et al. | |
| 8,107,987 | B2 | 1/2012 | Malladi et al. | |
| 2003/0087643 | A1 | 5/2003 | Mazzara | |
| 2003/0088695 | A1 | 5/2003 | Kwak et al. | |
| 2006/0280142 | A1 | 12/2006 | Damnjanovic et al. | |
| 2007/0091817 | A1* | 4/2007 | Yoon et al. | 370/252 |
| 2007/0201437 | A1* | 8/2007 | Kim et al. | 370/352 |
| 2008/0267165 | A1 | 10/2008 | Bertrand et al. | |
| 2009/0185632 | A1 | 7/2009 | Cai et al. | |
| 2009/0270103 | A1 | 10/2009 | Pani et al. | |
| 2009/0274096 | A1 | 11/2009 | Fu | |

(Continued)

FOREIGN PATENT DOCUMENTS

| JP | 2006-166436 | 6/2006 |
| WO | 2006/116102 | 11/2006 |

(Continued)

OTHER PUBLICATIONS

Office Action issued in U.S. Appl. No. 12/874,853 on Sep. 17, 2012; 22 pages.

(Continued)

*Primary Examiner* — Otis L Thompson, Jr.
(74) *Attorney, Agent, or Firm* — Fish & Richardson P.C.

(57) ABSTRACT

A method for an SS to perform network entry in a multi-carrier wireless environment that has a primary carrier and at least one secondary carrier associated with a BS, the method comprising: a. sensing a carrier in an area serviced by the BS; b. determining if the carrier is a primary carrier or a secondary carrier; and c. performing the network entry if the determining establishes that the sensed carrier is a primary carrier and not a secondary carrier.

21 Claims, 13 Drawing Sheets

(56) References Cited

U.S. PATENT DOCUMENTS

| | | | |
|---|---|---|---|
| 2009/0274120 A1 | 11/2009 | Chou | |
| 2009/0296643 A1 | 12/2009 | Cave et al. | |
| 2009/0303951 A1 | 12/2009 | Lunttila et al. | |
| 2009/0310563 A1 | 12/2009 | Chou et al. | |
| 2010/0034163 A1* | 2/2010 | Damnjanovic et al. | 370/329 |
| 2010/0035625 A1* | 2/2010 | Damnjanovic et al. | 455/450 |
| 2010/0056202 A1 | 3/2010 | Li et al. | |
| 2010/0098012 A1* | 4/2010 | Bala et al. | 370/329 |
| 2010/0130219 A1* | 5/2010 | Cave et al. | 455/450 |
| 2010/0271970 A1* | 10/2010 | Pan et al. | 370/252 |
| 2010/0316026 A1* | 12/2010 | Lee et al. | 370/336 |
| 2011/0002290 A1 | 1/2011 | Kim et al. | |
| 2011/0044220 A1 | 2/2011 | Park et al. | |
| 2011/0076999 A1* | 3/2011 | Kazmi et al. | 455/423 |
| 2011/0086662 A1* | 4/2011 | Fong et al. | 455/517 |
| 2012/0008580 A1 | 1/2012 | Lee et al. | |

FOREIGN PATENT DOCUMENTS

| | | |
|---|---|---|
| WO | 2009/082173 | 7/2009 |
| WO | 2010/032969 | 3/2010 |
| WO | 2010/053334 | 5/2010 |

OTHER PUBLICATIONS

Office Action issued in U.S. Appl. No. 12/874,853 on Jan. 22, 2013; 19 pages.

Ahmad, S. et al.; "Proposed Changes/Refinements to the Sections 4-9, 13, 14 and 17 of IEEE 802.16m SDD"; IEEE 802.16 Broadband Wireless Access Working Group; Document No. IEEE C802.16m-09/1196; Jul. 3, 2009; 52 pages.

Cho, J. et al.; "Proposed Text of Multi-Carrier Operation for the IEEE 802.16m Amdendment"; IEEE 802.16m Task Force m (TGm); Document No. IEEE C802.16m-09/0869; Apr. 27, 2009; 11 pages.

Fong, M. et al.; "Proposal for IEEE 802.16m Multi-Carrier Operation"; IEEE 802.16m Task Force (TGm); Document No. IEEE C802.16m-08/1063; Sep. 5, 2008; 10 pages.

IEEE 802.16 Task Group m (TGm); "The Draft IEEE 802.16m System Description Document"; IEEE 802.16 Broadband Wireless Access Working Group; Document No. IEEE 802.16m-08/003; Jan. 23, 2008; 19 pages.

Wang, L. et al.; "Comments on the Multi-Carrier DG Harmonized Text Proposal—MAC (1283)"; IEEE 802.16 Broadband Wireless Access Working Group; Document No. IEEE C802.16m-09/1619; Jul. 12, 2009; 15 pages.

International Search Report and Written Opinion of the International Searching Authority issued in International Application No. PCT/CA2010/001352; 13 pages.

International Preliminary Report in Patentability issued in International Application No. PCT/CA2010/001352 on Mar. 6, 2012; 9 pages.

Advisory Action issued in U.S. Appl. No. 12/806,193 on Oct. 28, 2013; 5 pages.

Office Action issued in U.S. Appl. No. 13/618,404 on Oct. 9, 2013; 15 pages.

Office Action issued in U.S. Appl. No. 12/874,853 on Oct. 4, 2013; 26 pages.

Office Action issued in U.S. Appl. No. 12/806,193 on Aug. 19, 2013; 27 pages.

Office Action issued in U.S. Appl. No. 12/806,193 on May 9, 2013; 23 pages.

Office Action issued in U.S. Appl. No. 13/618,404 on May 10, 2013; 14 pages.

Office Action issued in U.S. Appl. No. 12/874,853 on May 2, 2013; 20 pages.

Notice of Allowance issued in U.S. Appl. No. 12/806,193 on Mar. 26, 2014; 7 pages.

Notice of Allowance issued in U.S. Appl. No. 13/618,404 on Dec. 19, 2013; 14 pages.

Office Action issued in Japanese Application No. 2012-527165 on Mar. 5, 2014; 5 pages.

Notice of Allowance issued in U.S. Appl. No. 12/874,853 on Dec. 16, 2013; 8 pages.

Notice of Allowance issued in U.S. Appl. No. 12/874,853 on Mar. 7, 2014; 8 pages.

Notice of Allowance issued in U.S. Appl. No. 13/618,404 on Mar. 13, 2014; 8 pages.

Office Action issued in Japanese Application No. 2012-527165 on Jun. 24, 2014; 5 pages.

Office Action issued in Chinese Application No. 201080049519.9 on Aug. 29, 2014; 6 pages, No translation.

Office Action issued in U.S. Appl. No. 14/263,623 on Dec. 1, 2014.

Extended European Search Report issued in European Application No. 10813197.0 on Dec. 17, 2014; 7 pages.

Chou et al.; "Proposal for Multicarrier Uplink Control Structure"; IEEE C802.16m-08/303; May 5, 2005; 7 pages.

* cited by examiner

UPLINK CONTROL SIGNAL DESIGN FOR WIRELESS SYSTEM

CROSS-REFERENCE TO RELATED APPLICATIONS

This application is a continuation of the non-provisional application Ser. No. 12/806,193 resulting from conversion under 37 C.F.R. §1.53(c)(3) of U.S. provisional patent application No. 61/239,204 filed on Sep. 2, 2009, and which claims the benefit of U.S. provisional patent application No. 61/094,644 filed on Sep. 5, 2008.

MICROFICHE APPENDIX

Not applicable.

TECHNICAL FIELD

This application relates to wireless communication techniques in general, and to technique of the disclosure, in particular.

ART RELATED TO THE APPLICATION

Draft IEEE 802.16m System Description Document, IEEE 802.16m-08/003r1, dated Apr. 15, 2008, it is stated that:
  This [802.16m] standard amends the IEEE 802.16 WirelessMAN-OFDMA specification to provide an advanced air interface for operation in licensed bands. It meets the cellular layer requirements of IMT-Advanced next generation mobile networks. This amendment provides continuing support for legacy WirelessMAN-01-DMA equipment.
  And the standard will address the following purpose:
    i. The purpose of this standard is to provide performance improvements necessary to support future advanced services and applications, such as those described by the ITU in Report ITU-R M.2072.
  FIGS. 7-13 of the present application correspond to FIGS. 1-7 of IEEE 802.16m-08/003r1.

SUMMARY

Aspects and features of the present application will become apparent to those ordinarily skilled in the art upon review of the following description of specific embodiments of a disclosure in conjunction with the accompanying drawing figures and appendices.

BRIEF DESCRIPTION OF THE DRAWINGS

Embodiments of the present application will now be described, by way of example only, with reference to the accompanying drawing figures, wherein.

Like reference numerals are used in different figures to denote similar elements.

DETAILED DESCRIPTION OF THE DRAWINGS

Wireless System Overview

Figure 1:
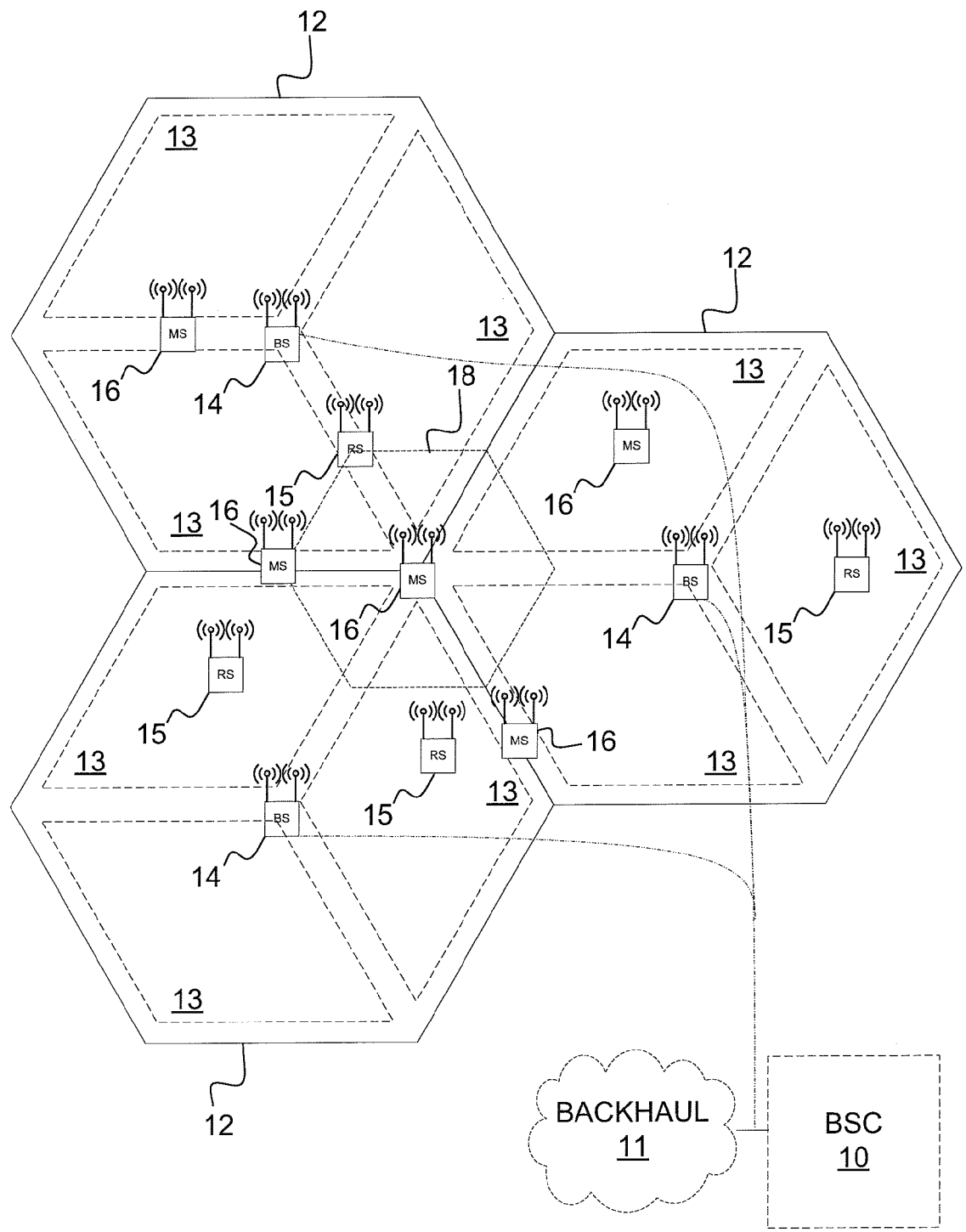
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
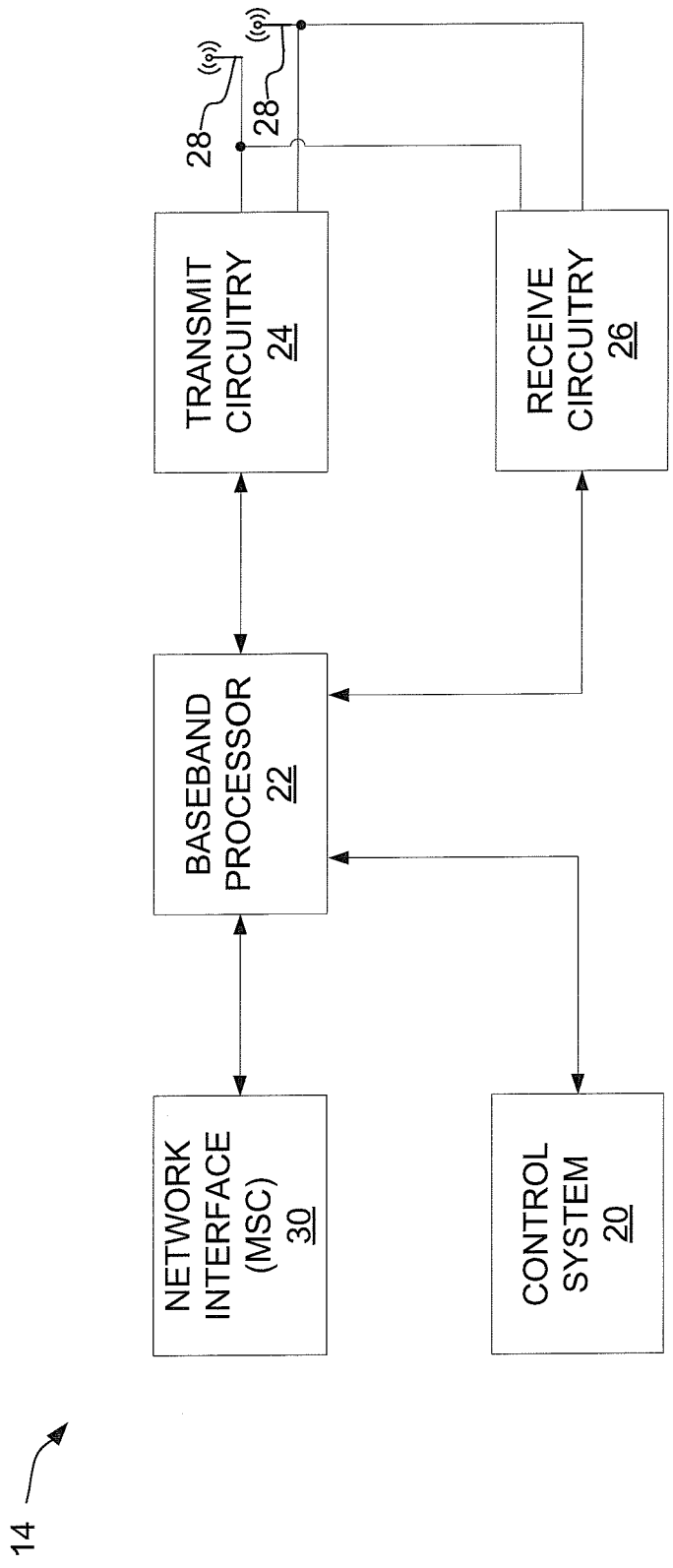
FIG. 2 is a block diagram of an example base station that might be used to implement some embodiments of the present application.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
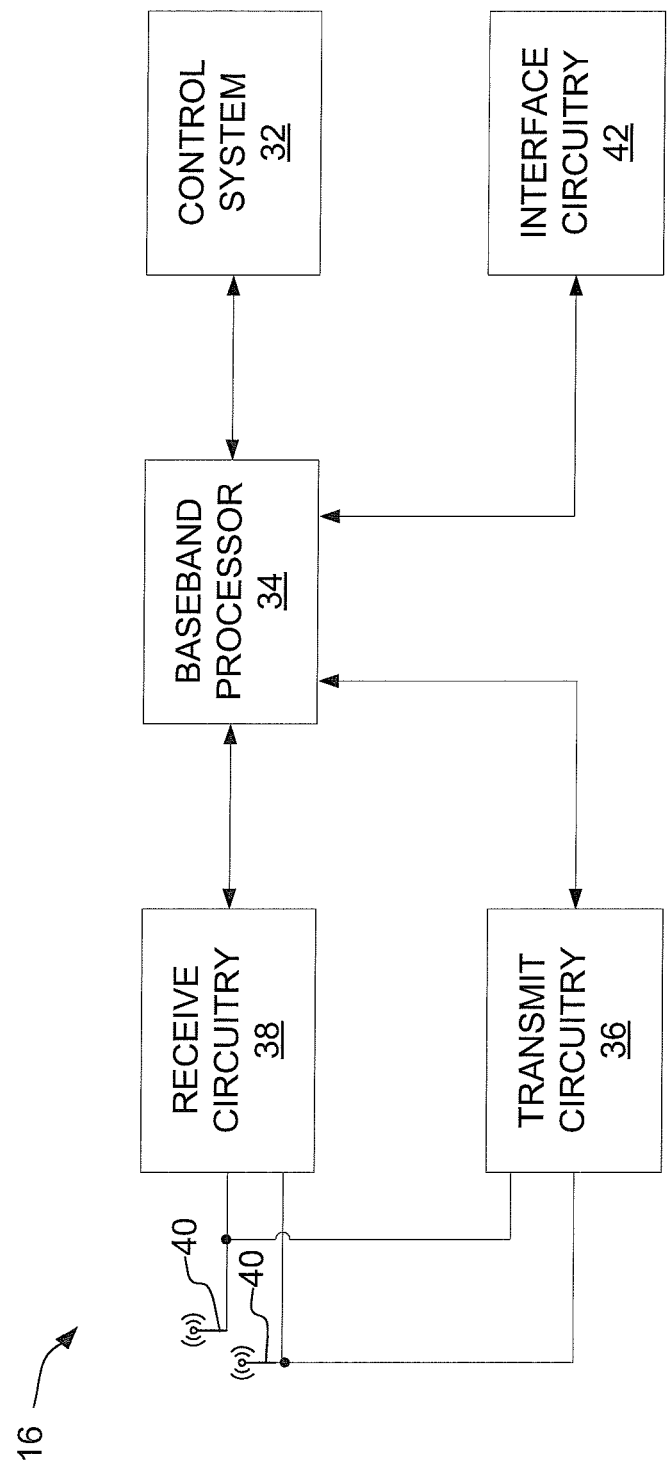
FIG. 3 is a block diagram of an example wireless terminal that might be used to implement some embodiments of the present application.

With reference to FIG. 3, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 ($n>=1$), and each mobile terminal 16 is equipped with "m" receive antennas 40 ($m>=1$). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
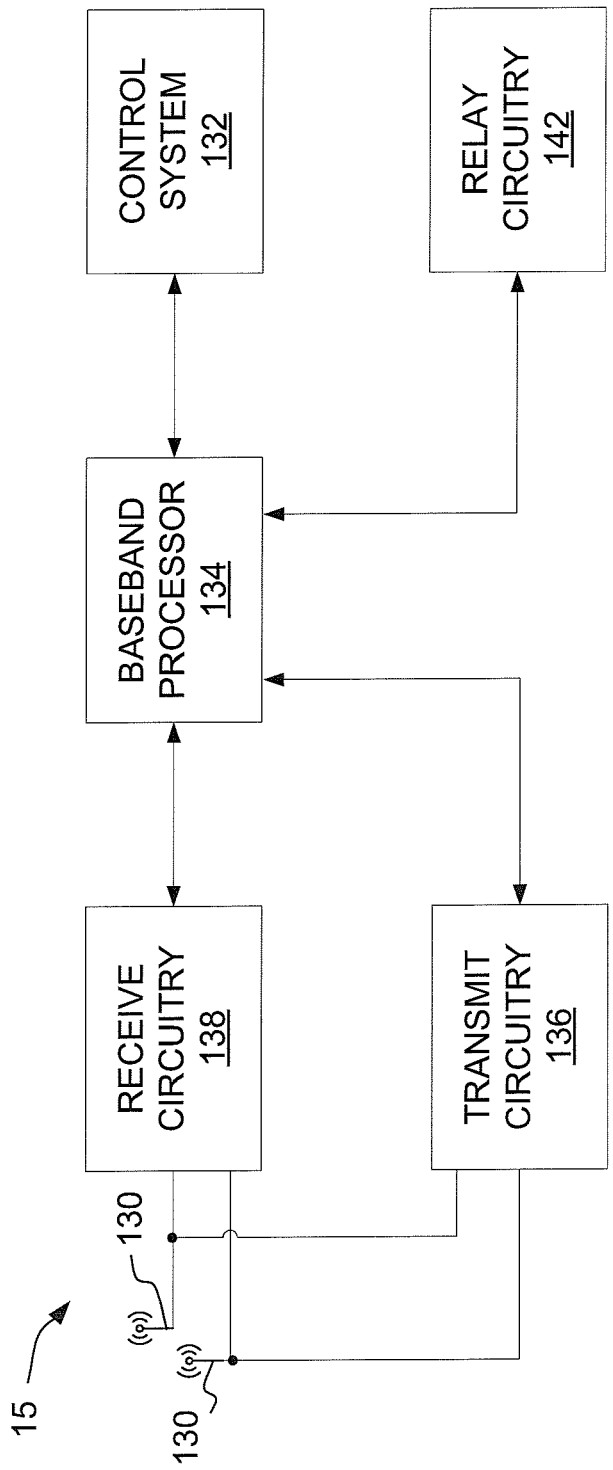
FIG. 4 is a block diagram of an example relay station that might be used to implement some embodiments of the present application.

With reference to FIG. 4, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
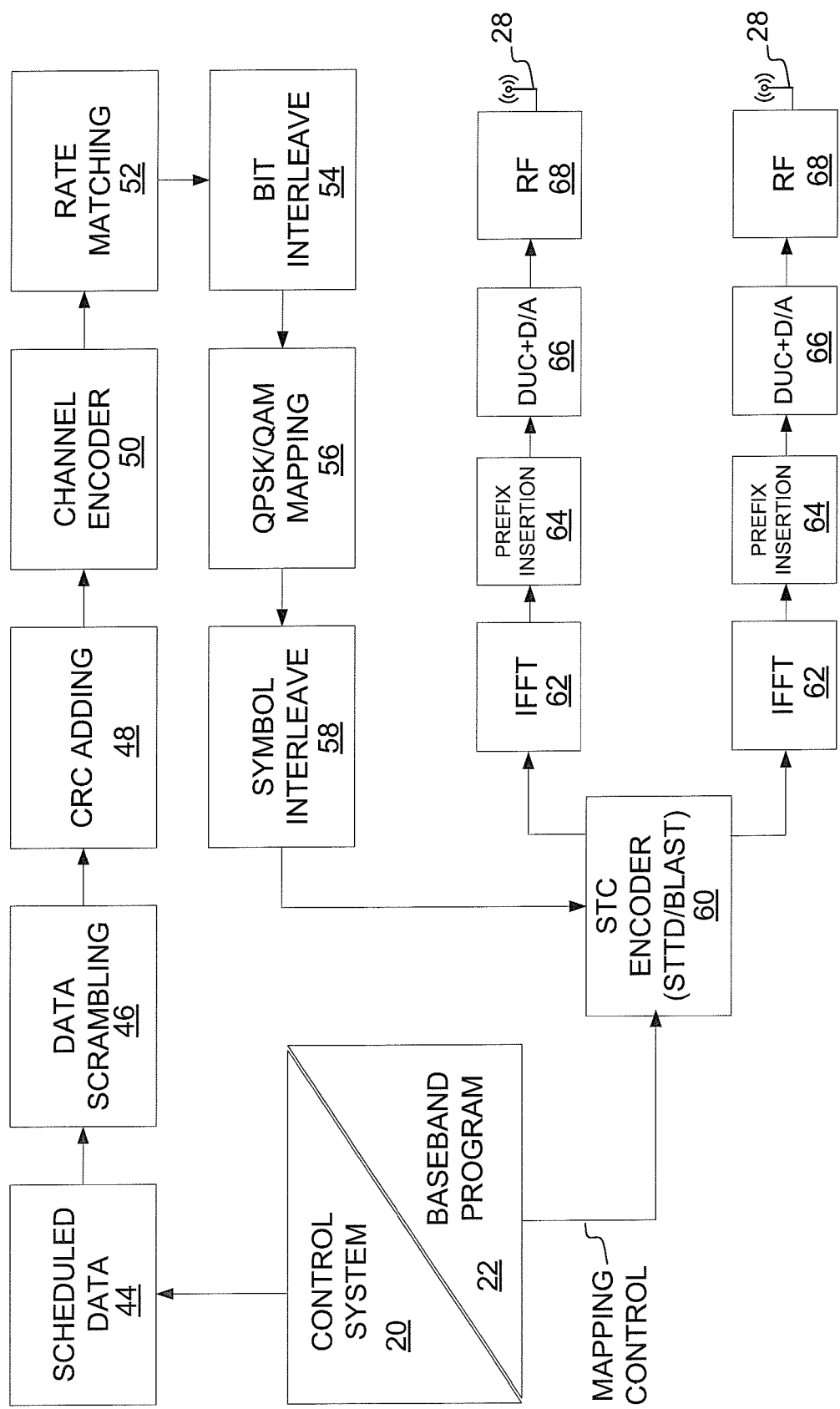
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
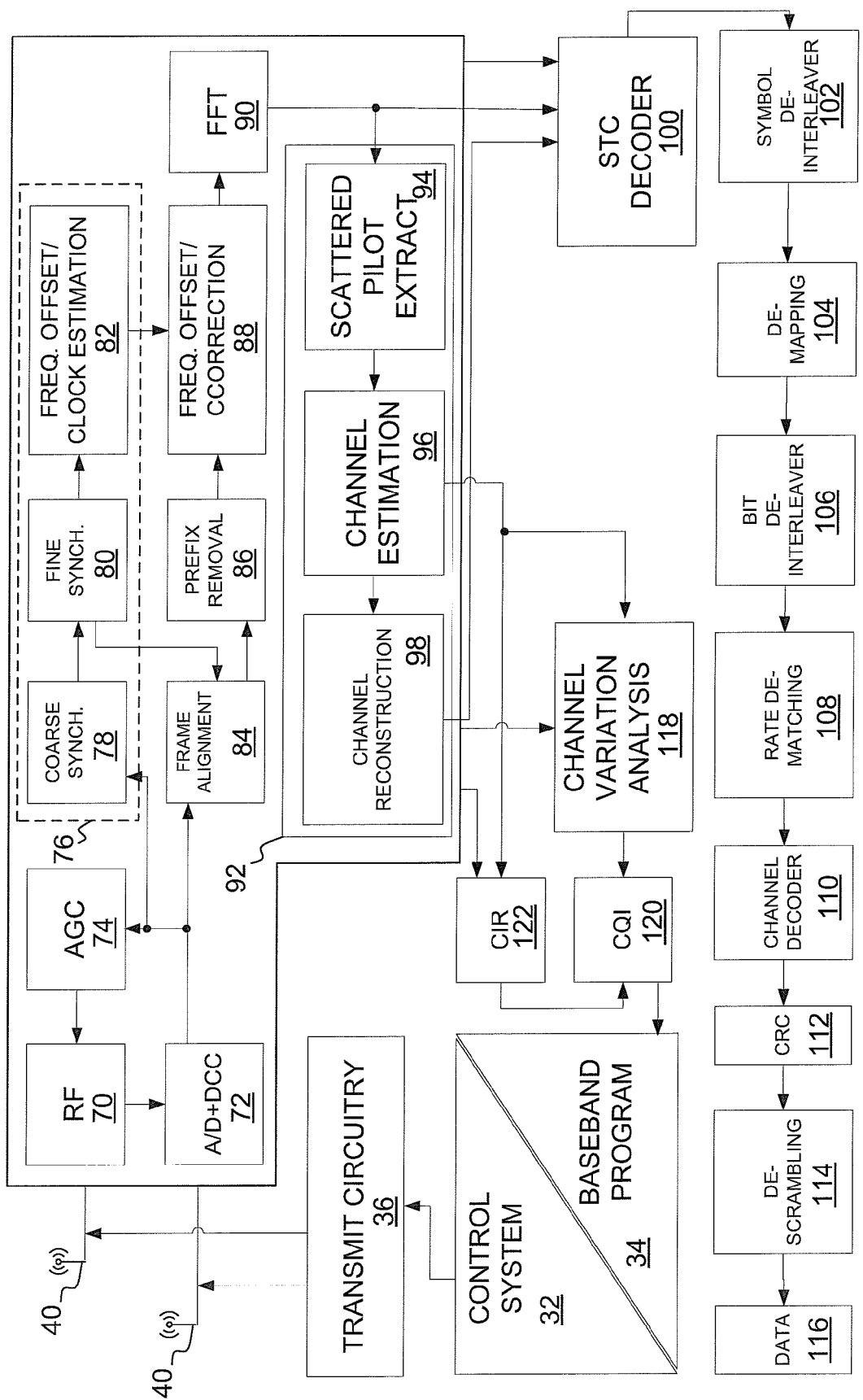
FIG. 6 is a block diagram of a logical breakdown of an example OFDM receiver architecture that might be used to implement some embodiments of the present application.
Figure 7:
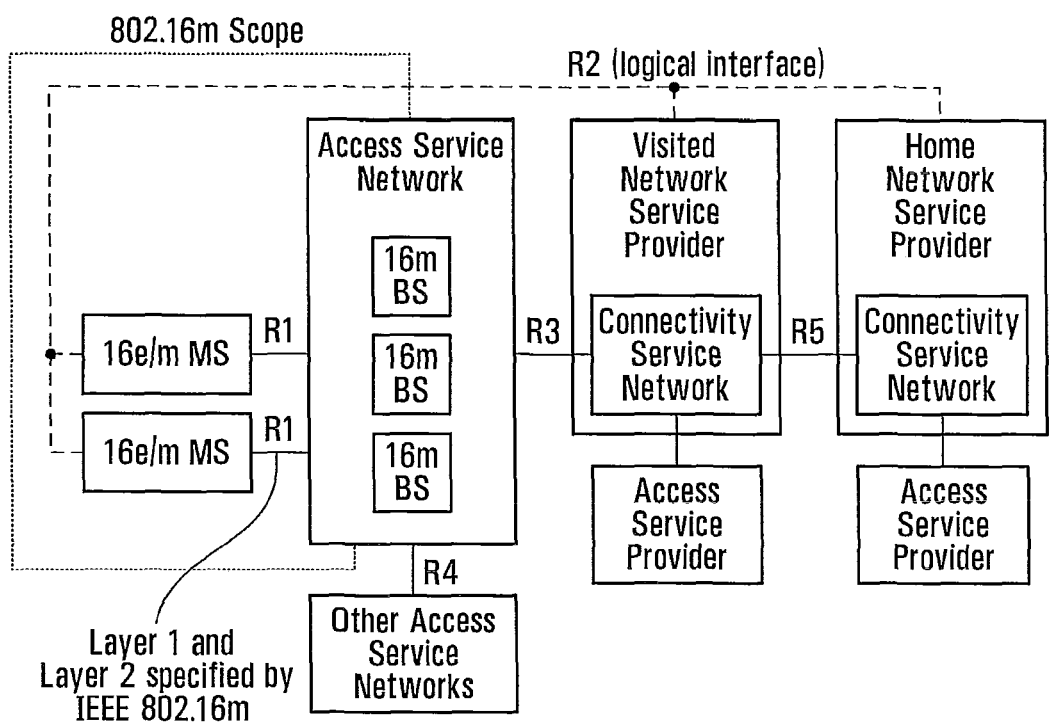
FIG. 7 is FIG. 1 of IEEE 802.16m-08/003r1, an Example of overall network architecture.
Figure 8:
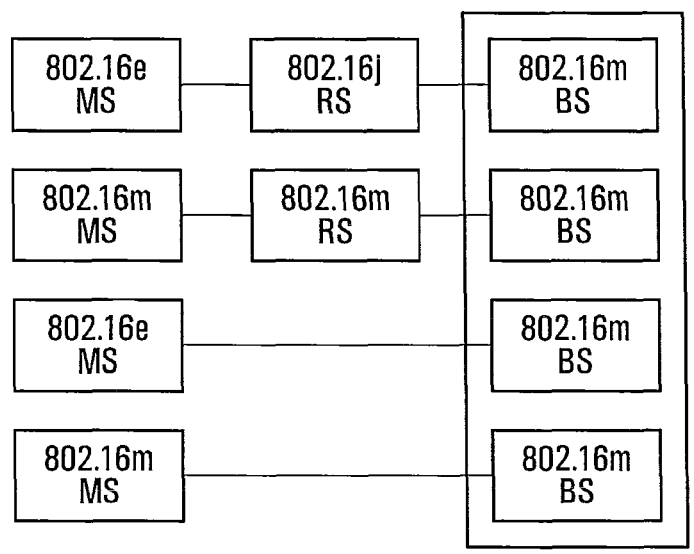
FIG. 8 is FIG. 2 of IEEE 802.16m-08/003r1, a Relay Station in overall network architecture.
Figure 9:
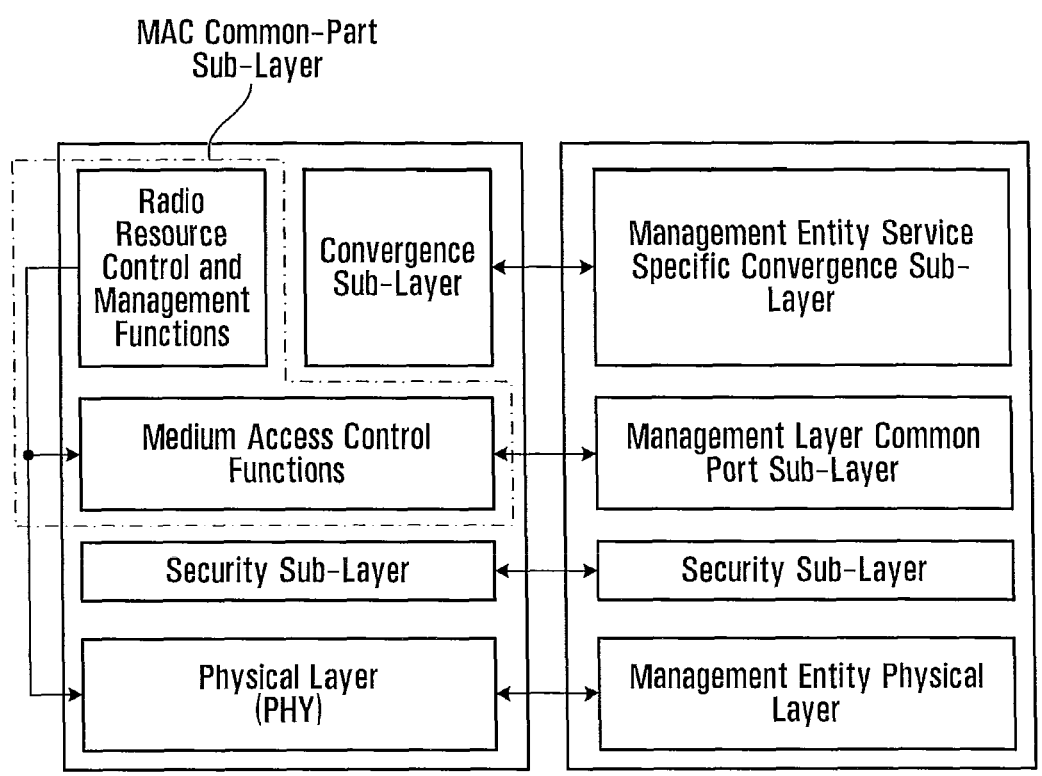
FIG. 9 is FIG. 3 of IEEE 802.16m-08/003r1, a System Reference Model.
Figure 10:
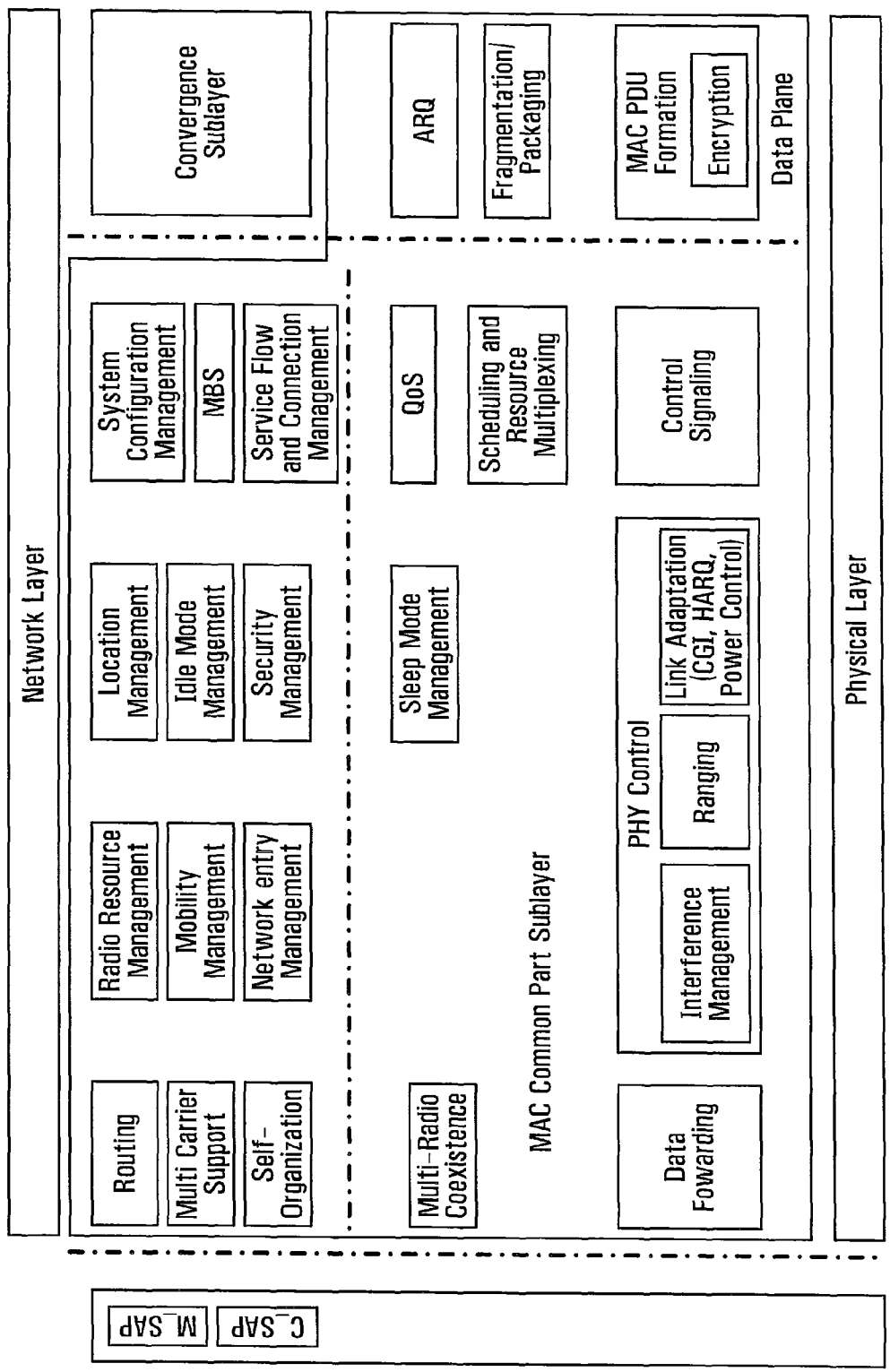
FIG. 10 is FIG. 4 of IEEE 802.16m-08/003r1, The IEEE 802.16m Protocol Structure.
Figure 11:
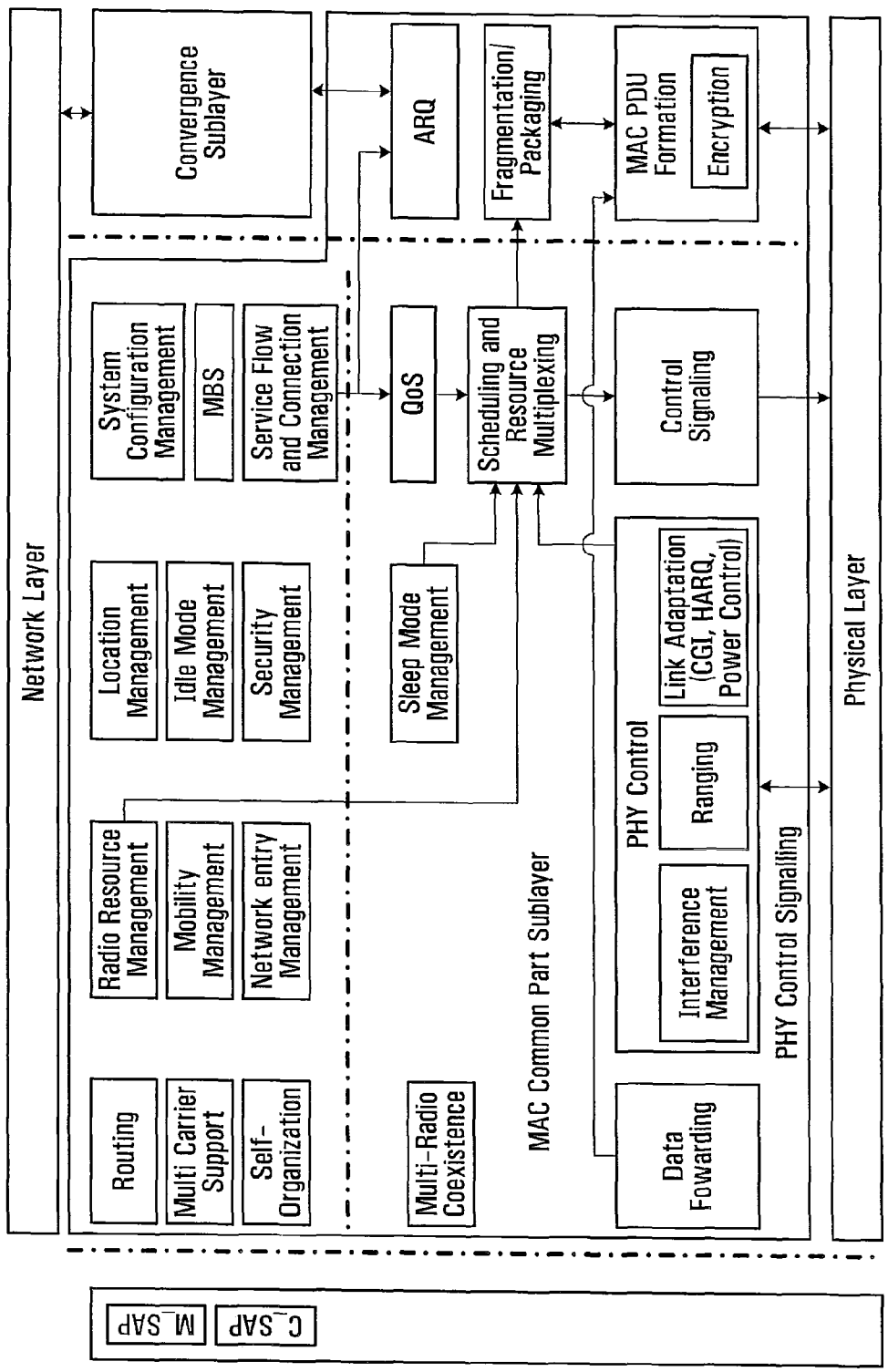
FIG. 11 is FIG. 5 of IEEE 802.16m-08/003r1, The IEEE 802.16m MS/BS Data Plane Processing Flow.
Figure 12:
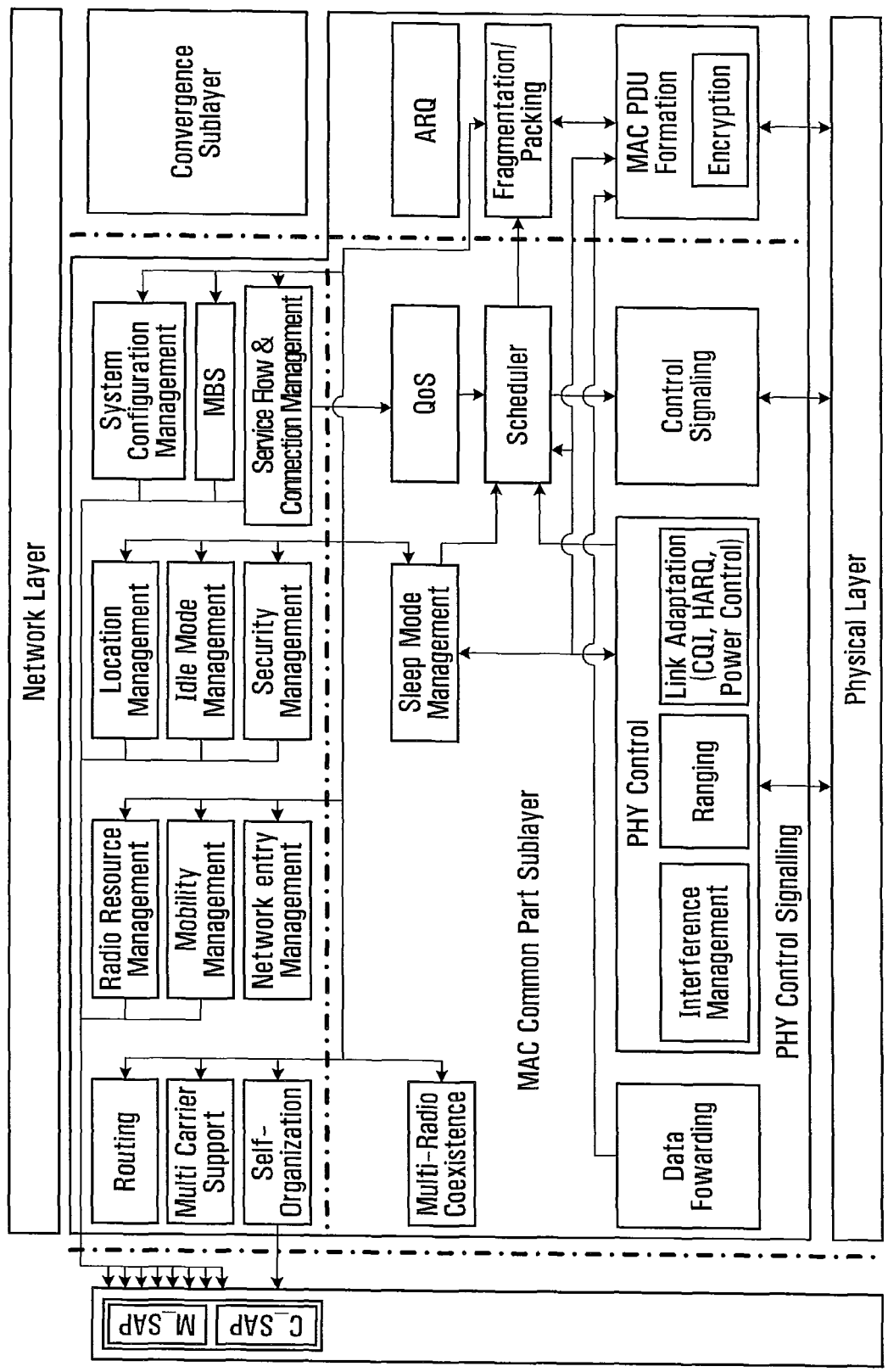
FIG. 12 is FIG. 6 of IEEE 802.16m-08/003r1, The IEEE 802.16m MS/BS Control Plane Processing Flow.
Figure 13:
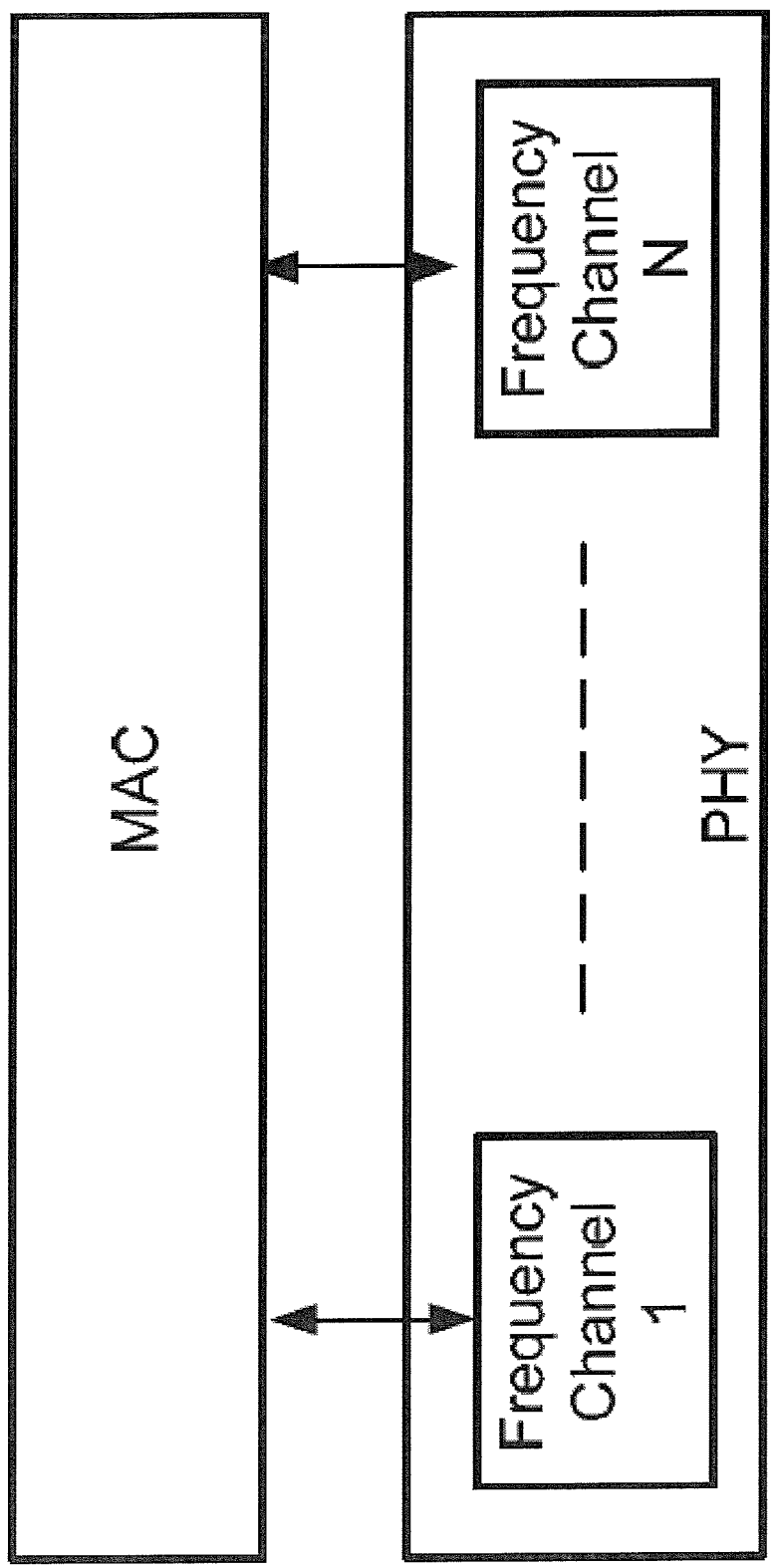
FIG. 13 is FIG. 7 of IEEE 802.16m-08/003r1, Generic protocol architecture to support multicarrier system.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, a relay station may operate in a time division manner using only one radio, or alternatively include multiple radios.

FIGS. 1 to 6 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

MULTI-CARRIER OPERATION

The present disclosure describes multicarrier operation for network entry, system information acquisition, handover, sleep mode, idle mode, channel quality feedback.

NETWORK ENTRY OPERATION

In some implementations, a mobile station (MS) performs network entry with a primary carrier of a BS. A MS needs to know which carrier(s) of the BS are primary carriers. There are 4 possible options that allow the MS to detect which carrier(s) are primary carriers.

Option 1: secondary carrier may have no preamble or sync channel. In such a case, the MS may not be able to perform synchronization with a secondary carrier and therefore may not proceed with network entry procedure with a secondary carrier. Option 2: secondary carrier contains preamble or sync channel. However, one of the broadcast channel (e.g. the primary broadcast channel) is not present. When MS does not detect the primary broadcast channel, the MS knows that this is a secondary carrier and may not proceed with network entry procedure with that carrier. Option 3: secondary carrier contains preamble/sync channel, and all broadcast channels (e.g. both primary broadcast channel and secondary broadcast channel). The primary broadcast channel or secondary broadcast channel contains control information that indicates whether the carrier is a primary or secondary carrier. Option 4: secondary carrier contains preamble or sync channel. Different preamble sequence is used to indicate if the carrier is a primary carrier or secondary carrier.

To facilitate the MS to select which primary carrier to perform network entry procedure, the broadcast channel transmitted on a primary carrier can carry information that helps the MS make the selection. Such information includes loading condition on the carrier, service or QoS offered on the carrier etc. MS enters the network through primary carrier. BS either semi-statically or dynamically assigns secondary carrier(s) via control signaling through primary carrier. MS may omit UL ranging (for time/frequency synchronization and power adjustment purpose) with secondary carrier. In this case, MS uses the same timing, frequency and power adjustment information for the secondary carrier as in the primary carrier. The MS may perform fine timing/frequency/power adjustment on the secondary carrier through measuring the preamble and/or pilot on the secondary carrier. BS may instruct the MS, through control signaling on the primary carrier, to perform UL ranging with one or more secondary carriers.

In both single carrier and multi-carrier operation, the MS network entry procedure can be simplified to the following:
  DL synchronization
  Obtain system information
  UL ranging/synchronization
  Authentication/security association establishment
  Capability negotiation and registration
  Connection establishment

OBTAINING SYSTEM INFORMATION OF SECONDARY CARRIERS

In some implementations, for a multi-radio MS or wideband MS where the MS can simultaneously decode multiple carriers, the MS can decode the broadcast channels of secondary carriers or other primary carriers. BS may instruct the MS, through control signaling on the primary carrier, to decode broadcast channels of specific set of secondary carriers.

For single radio MS or non-contiguous spectrum, where the MS cannot simultaneously decode multiple carriers, the BS can convey the system information of secondary carriers to MS, through control signaling on the primary carrier.

HANDOVER OPERATION

In an intra-BS handover, the BS may instruct the MS, through control signaling on the current primary carrier, to switch/handover to another primary carrier within the same BS for load balancing purpose or other reasons. In such a case, the MS just switches to the target primary carrier at action time specified by the BS. There is no need for handover re-entry procedure (i.e. ranging, network re-entry).

In an inter-BS handover, to facilitate MS' scanning of neighbor BS' primary carriers, the current serving BS may broadcast/multicast/unicast the neighbor BS' multi-carrier configuration information to the MS.

SLEEP MODE OPERATION

One set of unified sleep mode parameters (i.e., sleep window and listening window configuration) are configured for a MS regardless of single carrier or multi-carrier operation.

During listening window, MS monitors the traffic indication on the primary carrier. If traffic indication is negative, MS goes back to sleep. If traffic indication is positive, MS continues to monitor the primary carrier control channel to know if it has traffic scheduled for transmission on the primary carrier and/or secondary carrier.

IDLE MODE OPERATION

One set of unified idle mode parameters (i.e., paging listening window and paging unavailable window configuration) are configured for a MS regardless of single carrier or multi-carrier operation. During paging listening window, MS monitors the paging indication and message on the primary carrier. When paged, the MS perform network re-entry procedure with the primary carrier.

CHANNEL QUALITY FEEDBACK

Option 1: MS transmit the channel quality information (CQI) of a secondary carrier through the UL feedback control channel on the primary carrier. Option 2: MS is assigned UL feedback control channel on a secondary carrier. MS transmits the CQI of the secondary carrier through the assigned UL feedback control channel on that carrier. Option 3: MS is assigned UL feedback control channel on a subset of secondary carriers. MS transmits the CQI of a number of secondary carriers (as instructed by the BS) through the assigned UL feedback control channels on the primary carrier and a subset of the secondary carriers.

HIGH LEVEL STRUCTURE OF MC-DV (MULTI-CARRIER-DATA AND VOICE)

CARRIER STRUCTURES

On the forward link, N×1.25 MHz carriers (N>=3) can be configured for the MC-DV system. The chip rate of each carrier is operated at 1.2288 Mbps. The configurations of these carriers are defined as follows: One or more primary carrier is defined in a MC-DV system. The primary carrier is code division multiplexed using Walsh code. Pilot, paging and sync channel as defined in cdma2000 are transmitted on the primary carrier. These channels will have the same configuration as 1XRTT overhead channels for backward compatibility reasons. The primary carrier can be overlaid to the existing 1S95, 1S95A&B and 1XRTT carriers. The primary carrier is used to provide voice and other real-time services to the users. The primary carrier can also be used to transmit medium access control (MAC) information to the mobile station.

The supplemental carrier(s) are used to provide various types of data services to the users on the forward link. The supplemental carriers can be time division multiplexed or code division multiplexed. The assignment of the time slot or code space on the supplemental carriers are transmitted by the MAC channels on the primary carriers.

CHANNEL AND FREQUENCY ASSIGNMENT 1 to N carriers can be assigned to one or a group of users to transmit and receive data on forward and reverse link. FIGS. 14(a) to 14(d) are examples of different configurations. Please note that this invention does not preclude other forward and reverse carrier assignment configurations. For example, when only one carrier is used, this carrier does not need to be always in the center of the 3-carrier group.

The following describes the forward link operations. When connected, the base station directs each mobile station to perform the C/I estimation of M (M<=N) carriers periodically. Upon receiving the feedback, the base station schedules target mobile station, the carrier assignment and the transmission data rate for each time slot or code space based on the channel condition and the type of services of the targeted user, as well as the loading condition on different carriers. Mobile station detects the assignment from the MAC channel and receives the transmission slots accordingly.

ADAPTIVE MODULATION AND CODING ACROSS DIFFERENT CARRIERS FOR FORWARD LINK

The base station schedules the transmitted frequency carriers, the payload size, the modulation and the coding schemes of each burst to users according to the channel estimation from each mobile stations and the type of services of each user.

Different modulation and coding scheme for different carriers can be assigned to each user. For instance, the user may be assigned on only one carrier for the data burst. This happens probably because there is a big difference between the channel conditions on different carriers, thus the base station selects to transmit to the target user only on the carrier with the best channel condition to improve the overall system throughput. The user may also be assigned on more than one carriers for the data burst. This happens probably because the channel conditions among different carriers are relatively same. Thus the base station will transmit on multiple carriers to benefit from frequency diversity. In addition, the loading condition of different carriers may also influence base station's decision of carrier assignment.

When transmitted on different carriers simultaneously to the same user for the same packet, a generic coding and punctuation scheme is employed. The packet will be coded by Turbo code with a base coding rate. Then coded bits will be divided into sub-code blocks. The number of sub-code blocks corresponds to number of carriers assigned. The block size of different sub-codes may not be the same due to the possibility of different modulation schemes on different carriers.

RETRANSMISSION ON DIFFERENT CARRIERS FOR FORWARD LINK

MC-DV uses physical layer HARQ to improve the performance. Upon receiving each packet, the mobile station transmits ACKlNAK feedback to the base station. The base station then transmits the redundancy bits to the mobile station. The base station selects the designated carriers, the coding and modulation schemes of the retransmission packets according to mobile station's feedback on channel estimations at the time of retransmission. The sequence number in the MAC channel assignment informs the mobile station that it is a redundancy transmission.

SERVICE-DRIVEN PROTOCOL DESIGN

Overall Protocol Structure

As described in previous sections, the physical layer resource assignment to each mobile station is performed according to the radio channel condition experienced in the forward link of the mobile station; as well as service requirements which are defined by upper protocol layers, i.e. air-interface protocol layer 2 and 3. The physical resource can be divided into two domains: frequency domain in terms of carrier(s); and time domain in terms of time slot(s). We propose a versatile service-driven protocol design consists of a common layer 2 and layer 3 protocol stack as shown in FIG. 15, to support multiple, inhomogeneous carriers and physical layer configurations. The layer 2 and 3 protocols provide a common interface with the wireline upper layer protocols such as PPP/IP/TCP. The layer 2 and 3 protocols interface with the multi-mode physical layer by selecting the appropriate physical layer resource in both frequency domain and time domain to meet the quality of service required by upper layers applications as well as the subscriber's profile. One possible implementation of the protocol layers is shown in FIG. 15, where centralized L2/3 is implemented in the base station controller (BSC), distributed layer 2/3 is implemented in the base station subsystem (BTS) controller, and the different physical layer configurations are implemented in the BTS' modem. This invention does not preclude any other forms of implementation that realize the multi-carrier protocol structure proposed herein. The multi-mode physical layer consists of 1 to N carriers, where each of the carrier can be configured differently in terms modulation and coding schemes, as described in previous sections. Each of the carrier can also be configured differently in terms of the QoS or the set of QoSs it provides to the upper layers. The layer 2 protocol consists of the one or more Radio Link Protocols (RLPs) and one or more Medium Access Control (MAC) sublayer. Alternatively, QLP (QoS Link Protocol, to be described later), may be used instead of RLP. RLP provides transparent (no ARQ) or non-transparent (with ARQ) link layer control. The data plane of the MAC sublayer provides dynamic multiplexing and demultiplexing of layer 2 frames from one or more users or terminals to/from physical layer frames. The control plane of the MAC sublayer consists of a MAC state machine per user/terminal. The layer 3 protocol defines a set of signaling messages and signaling flows that controls the overall air-interface operations.

Layer 2/3 and Physical Layer Interface

We propose the following protocol interface between layer 2/3 and physical layer, as shown in FIG. 16. The physical layer resource as presented to layer 2/3, is defined as consisting of a set of resource pools. Each of the resource pool is uniquely defined based on the following parameters:

Quality of service supported which may include, but not restricted to, data rate (minimum, maximum, mean), service type such as real-time or delay tolerant service List of manageable resources such as time slots, spreading codes, power, modulation and coding set Carrier identification Air-interface configuration, such as IS-95, 1xRTT, 1xEV-DO or other new configurations Please note that one or more resource pools may reside on the same carrier. On the other hand, a resource pool may consist of multiple carriers. A mobile station can use one or more resource pools at any particular instance. Layer 2/3 performs fast and dynamic management of the physical layer resource, defined as a set of resource pools, to meet upper layers service requirements and resource availability at each pool. Resource availability of each pool can be dynamically affected by the loading and the forward link channel condition experienced by the mobile station at the particular pool. A centralized resource control performs call admission, slow quasi-static, time-of-day management of the pools' characteristics and boundaries.

The following describes one implementation of the resource pools configuration in the forward link:

Resource Pool # 1:
 primary carrier # 1
 1xRTT backward compatible
 manageable resource Walsh codes, forward power
 service characteristics: real-time voice service
Resource pool # 2:
 primary carrier # 1
 1xRTT backward compatible
 manageable resource Walsh codes, forward power
 service characteristics: real-time data service Resource pool #3:
 supplemental carrier #2
 Non backward compatible. New physical layer (AMC etc.).
 Manageable resource: time slots
 service characteristic: delay tolerant service
Resource pool #4:
 supplemental carrier #3
 Non backward compatible. New physical layer (AMC etc.).
 Manageable resource: time slots
 service characteristic: delay tolerant service QLP (ODS Link Protocol)

In additional to the traditional, backward compatible RLP, a new QLP is introduced: Each user typically has one QLP instance, although more than one QLP per user is also allowed.

Each QLP can support to up to 4 streams of user data/applications.

QLP accepts two types of data stream.
 PPP over HDLC for efficient over the air delivery.
 Individual IP packets. IP AL (filed separately) is used for zero padding and multiplexing small packets if needed.

QLP employs fixed size PDU, which can be N times of QLP Base_Size. The QLP Base_Size is small enough for efficient VoIP transmission.

QLP uses QLP packet count instead of data octets count as sequence number.

QLP may employ different ARQ mechanism (NAK or ACK) or no ARQ at all (for voice) for each stream of data.

Each QLP PDU carries a priority indicator. The value of this priority indicator is set according to a set of QoS requirements:
 User's overall QoS class
 Application's QoS requirements
 Current data transmission condition (e.g., it could be a function of the number of QLP packets in the transmission buffer waiting for transmission or the average data throughput. The priority may be increased/decreased accordingly to maintain the data rate and/or packet delay)
 Scheduler feedback (e.g., scheduler may request all QLP to lower the priority of its low QoS class packet when its resource is running tight)

SCHEDULING

The following dynamic management of physical layer resource at the base station is proposed:

Each user may have access to both dedicated channel(s) and shared channel(s). These channels may be power controlled or rate controlled.

For each packet, layer 2/3 decides which pool or pools it should be sent, based on call setup service configuration), and based on the packet's QoS priority.

The scheduler may actively manage the QoS priority for packets waiting in its transmission queues. And a packet originally assigned for shared channel transmission may be switch over for dedicated channel transmission if the packet has been waiting for too long or if the shared channel cannot meet its QoS requirement)

Layer 2/3 scheduler decides which packet should be sent based on the following parameters (please note that other parameters are not precluded by this disclosure):
 time-to-live (applicable for pseudo-real-time service only)

relative users' priority (applicable for deployment scenario where 'absolute' QoS is not defined)
guaranteed minimum average data rate
channel condition feedback from the mobile station
the capacity cost of each RF channel

REVERSE LINK

In some implementations, MC-DV reverse link operates as following:

ACTIVE MODE

Reverse link frame size is 10 ms or 5 ms, in order to take advantage of multi-user diversity. It can't be too small because of no accurate time synchronization.

Before mobile station starts to transmit, it sends out R_DataRateRequest. Mobile station calculates R_DataRateRequest based on the its current pilot transmission power (since the reverse link is power controlled, the current transmission power basically acts as DRC feedback for base station), active set (for active set>1,the max_R_DataRateRequest is significantly restricted) and service needs.

Upon receiving the R_DataRateRequest, the base station grants the transmission of the mobile station at the next slot by sends out its MAC ID on RL_ASSIGNMENT_CH. The RL_ASSIGNMENT_CH may have more than one MAC ID at the same slot. (may use Qualcomm's idea for different long code mask instead of MAC ID) For mobile station in soft handoff, mobile will transmit if anyone base station assigns it.

During the transmission, a RL_RATE_CONTROL_CH controls the up/down of the transmission rate for each mobile station. For mobile in soft handoff, it use or of downs.

RETRANSMISSION

H-ARQ is employed on reverse link. RL_ARQ_CH is transmitted on the forward link to send ACK/NAK. Sub-code is used for incremental redundancy. RL_ARQ_CH, RL_RATE_CONTROL_CH and RL_ASSIGNMENT_CH can be combined into one RL_MAC_CH.

MAC STATE MACHINE

We propose the following overall MAC states for the control plane of each user: Active state, Standby state, Dormant state and Nun state. The MAC states configuration is shown in FIG. 17. The concept of standby state is described in a separate patent application. For 1xRTT terminals, the standby state will be bypassed.

To support the standby state in MC-DV system, the paging channels can be split into two groups (refer to FIG. 17). The first group which is the General Paging channels has the same functionality as in 1XRTT, to page users in dormant state. The second group which is the Standby Paging channel, is used to page standby state users only.

In the active state, the mobile monitors the dedicated or common control channel on the primary carrier for control information to receive data over the traffic channel(s) in the primary and/or supplemental carrier(s).

In the standby state, a mobile monitors Standby Paging channel periodically. In this state, a mobile monitors only the primary carrier for possible paging message. To support fast state transition, the monitoring cycle can be flexibly configured, e.g., Sms, 10ms, 20 ms, or K*20 ms (K is an integer number). To decrease interference of this Standby Paging channel, blind rate detection at the mobile or DTX mode can be supported. To decrease overhead caused by paging standby users, a short paging message is designed which includes a Standby user ill and a pointer. This pointer introduces the mobile to an appropriate control channel for subsequent resource assignment.

802.16M CONTROL FRAMEWORK

The application proposes the different aspects of control signaling mechanism between BS and MS to support system operation including system configuration, resource allocation/control, paging, MS network entry, power saving modes, multi-carrier operation. The proposed scheme allows reduced control overhead, enables power saving reduces MS processing requirements and enables MS fast network entry.

To reduce the broadcast control signaling overhead, we propose the BS to transmit static systemwide information, only when the BS detects that there is MS attempting to enter the network. There are two general types of static system wide information. One is essential physical layer configuration information that is needed for initial system access. Second is MAC/upper layer information that is not needed for initial system access. For the former, the BS has to broadcast the information once it detects that there is one or more MSs attempting network entry. For the latter, the BS unicasts the information the MS after the MS has performed mitial system access.

In order for the BS to detect if there is one or more MSs attempting to enter the network, the BS broadcast the uplink ranging (or random access) information periodically so that MS attempting network entry can decode such information and use it for transmitting up ink ranging (random access).

Since different types of control signaling, e.g. system configuration broadcast, paging, resource allocation/control, should be sent at different periodicity and some are event driven (e.g. paging information does not have to be sent if there is no MS to page), we propose to signal the presence of a particular type of control information using a Broadcast Pointer Channel (BPCH). An MS only needs to decode the BPCH to find out if it needs to decode subsequent control channels. This enable power saving. To further reduce overhead BPCH may not be present in every frame. We propose two options for MS to detect whether BPtH is present or not. One option is MS performs blind detection on the presence of BPCH. Second option is the presence of BPCH is indicated by a flag in the multicast control segment (MCCS), where MCCS is a segment that is already present in every frame for the purpose of resource allocation/control.

As it is critical for MS to receive system configuration information sent by the BS, we propose schemes to enable MS to track whether it has the most up to date system configuration information sent by the BS. The schemes proposed also enable power saving of MS in normal mode, sleep mode and Idle mode. We propose the overall MS network entry procedure based on the components listed above. For the case of multi-carrier deployment, a wideband MS can be instructed by the BS to monitor a subset of the carriers for control information, for power saving purpose, reduce processing requirements, as well as reduce system control signaling overhead. We propose primary and secondary carriers which carry different types of control information.

This contribution presents the types of control information required for 802.16 m system operation including system access, transmission/reception of traffic packets, handover etc. Different types of control information has different characteristics in terms of the frequency of change, broadcast or unicast, robustness requirement, importance to initial system access, etc. Therefore, different types of control information should be treated differently. This contribution presents how each type of control information should be transmitted by the BS and received by the MS. A description of the MS network entry procedure as well as sleep mode operation are provided in terms of how the MS obtains the necessary control Information for proper operation. The support of multi-carrier operation is also described in terms of how MS monitors each carrier for the necessary control information.

CONTROL INFORMATION IN LEGACY 16E SYSTEM

In 16e, scheduling control information is sent in MAPs, while system information is sent in DCD/UCD. In addition, neighbor BS information and paging information are sent on broadcast MAC messages. Some of the information sent on MAPs are not necessary dynamic and therefore can be sent in less frequent manner to reduce overhead. E.g., STC zone switch IE, ranging region definition, fast feedback region definition. Some of the information in DCD/UCD are static system information, thus does not need to be periodically broadcast to MSs that have already entered the network or broadcast with a relatively long period to improve reliability. E.g., BS 10, operator 10, subnet 10, TDD ratio. Some of the information in DCD/UCD are semi-static system configuration information, thus does not need to be periodically broadcast to MSs that have already entered the network if the configuration hasn't been changed or broadcast with a relatively long period to improve reliability (e.g., burst profile, handover parameters). Similarly, neighbor BS information which is semi-static information does not need to be periodically broadcast to MSs that have already entered the network if the configuration hasn't been changed.

TYPES OF DL CONTROL INFORMATION

TABLE 1.1

| Control information type | Examples | Characteristics | Control channel design |
|---|---|---|---|
| 1) Essential static systemwide PHY information for decoding of OL PHY frames/sub-frames | Bandwidth configurations, CP sizes, multi-carrier configuration, system time, TDD ratio, guard tones. | Static system-wide deployment specific parameters. Required for fast initial access during network entry. MS should be able to decode these information after synchronization | Information should be broadcast either a) periodically or b) initial ranging event. If case a), these information should be carried in a fixed resource location within a superframe. In case b), the presence/absence of the information is signaled by a Broadcast Pointer Channel (BPCH). Information should be delivered with very high reliability. |
| 2) Essential pseudodynamic sector-wide PHY information for decoding of OL PHY frames/sub-frames (i.e., superframe configuration control information) | Channelization (partitioning of diversity zone, localized zone, pilot structure etc.), legacy/16 m resource partition, sub-frame control configuration etc. Can contain initial ranging region/codes information for MS to do fast initial access Procedure. | Information can change from one superframe to another. Required for fast initial access during network entry and handover. MS should be able to decode these information after synchronization and information in 1). | Information should be broadcast periodically every superframe. These information should be carried in a fixed resource location within a superframe. Information should be delivered with very high reliability. |
| 3) Non-PHY system information | BSID, operation ID, subnet ID etc | Static system information | Since information is static, it doesn't have to be periodically broadcast to MSs. It can be sent by unicast to a MS during initial network entry. These information does not have to be carried in fixed resource location. |
| 4) PHY/MAC system configuration information | Handover parameters, power control parameters, fast feedback region, ranging region etc. | Semi-static system confriguraiton information, Configuration parameters values can change in a slow fashion (on order of seconds/minutes/hours). | For MS already entered the network, there is no need to broadcast the infomiation in frequent configuration parameters, if the information hasn't changed. The control channel design should support efficient power saving for sleep mode and idle mode MS while ensuring any changes in the system configuration is received by the MS in timely fashion. For MS performing initial network entry, the system configuration information is sent as unicast message to the MS during network entry procedure to expedite the network entry. Note that BS has to already completed initial ranging procedure with MS. Details of the design to transmit this type of information is given in slides 10-12. |

TABLE 1.1-continued

| Control information type | Examples | Characteristics | Control channel design |
| --- | --- | --- | --- |
| 5) Neighbor BS information | Information types 3) and 4) of neighbor BSs | As indicated in previous slide for type 3) and 4) | Information can be broadcast periodically or event triggered. The information can also be unicast to MS who wants to add a neighbor BS to the active set. |
| 6) Paging information | Quick paging and regular paging information | Non-periodic information. Event driven | Information should be broadcast whenever there is one or more MS to page. |
| 7) Dynamic DL and UL resource allocation and control information related traffic burst assignment | Burst assignment related information: MCS, MIMO mode, resource location. user ID ACK./NAK of UL traffic UL power control | Dynamically changes every sub-frame | Control information is unicast if the traffic burst is unicast. Control information is multicast/broadcast if the traffic burst is multicast/broadcast/ Resource location indication is multicast. |

BROADCAST POINTER CHANNEL (BPCH)

The broadcast of Information types (1), (3), (4), (5), (6) may or may not be present in a sub-frame or superframe boundary. To efficiently indicate the presence/absence of these information block, a 16m Broadcast Pointer Channel (BPCH) is introduced.

The 16m BPCH contains the following: information blocks presence flags, length of each information block that is present. Examples of information blocks are: System information, types (1); (3), (4), (5). In this information block, multiple MAC management messages for the different information types can be encapsulated. Paging information (type (6)) (either quick paging or full paging information).

One benefit of 16m BPCH is to allow sleep mode and idle mode MS to only decode the 16m BPCH to find out if broadcast information is present and whether the broadcast information present is relevant or not (e.g. paging information is not relevant to sleep mode MS). If the broadcast information is not present or the broadcast information not relevant, the MS can go back to sleep without the need to decode the rest of the sub-frame and the resource allocation/control information, i.e. type (7). If the broadcast information is present and relevant, the MS just needs to decode the relevant broadcast information and go back to sleep without the need to decode the rest of the sub-frame and the resource allocation7control information, i.e. type (7).

BPCH mayor may' not be present in each sub-frame. There are two options of how the presence of BPCR can be detected. Option 1: A 'BPCH present' flag is added to the multicast control segment (MCCS) to indicate the presence/absence of the BPCH. Note that MCCS contains control information to indicate the partitioning of resource within a frame for traffic bursts. MCCS is of fixed length and modulation/coding (refer to contribution NNN for details). An MS first decodes the MCCS. If the 'BPCH present' flag is set to '1' (i.e. BPCH is present), the MS will decode the BPCH. The length and modulation/coding of BPCH is fixed. The information contained in BPCH will allow the MS to decode the system broadcast information that follows. The remaining resource in the sub-frame is for traffic burst and the partitioning of those resources is signaled by the MCCS. If the 'BPCH present' flag is set to '0' (i.e. BPCH is not present), the MS will know that both BPCH and system broadcast information are not present. The remaining resource in the sub-frame is for traffic bursts, and the partitioning of those resources is signaled by the MCCS. Option 2: If present, BPCH is located at fixed location in a sub-frame. It has fixed length and modulation/coding. MS performs blind detection to decide if BPCH is present or not. An MS first attempts to decode BPCH. If decoding successful, the information contained in BPCH will allow the MS to decode the system broadcast information that follows. The remaining resource in the sub-frame contains the MCCS and resource for traffic bursts. The partitioning of the resource for traffic burst is signaled by the MCCS. Note that MCCS is of fixed length and modulation/coding. If MS does not successfully decode the BPCH, the MS will assume that both BPCH and the system broadcast information are not present. The MS proceeds to decode the MCCS and the rest of traffic burst if applicable.

TRANSMISSION OF SYSTEM CONFIGURATION INFORMATION

As this type of information is semi-static and can change, the BS has to inform the MS in a timely manner when the information changes while enabling power saving of MS. In one implementation, a 'system configuration change count (SCCC)' is included in the system configuration broadcast messages sent from the BS. It is used to indicate the version number of the associated system configuration information. An action timer is included in the system configuration-broadcast messages to indicate when the associated system configuration takes effect. Overall, an MS stores up to two sets of SCCC values and corresponding system configuration information in its memory. One is the SCCC value and corresponding system configuration information currently in effect. The other is the SCCC value and corresponding system configuration information that will take effect at a specific action time. BS transmits a SCCC and a 'system configuration change alert (SCCA), flag periodically in a frequent manner. For example, every superframe as part of the superframe configuration control information, i.e. type (2). The SCCC is used to indicate the version number of the system configuration information currently in effect. The SCCA flag is used to indicate if BS has broadcast new system configuration information than those associated with the current SCCC.

By detecting the SCCC value, the MS knows the current version of the system configuration information in effect and therefore can configure itself accordingly if the MS has previously received the corresp0nding system configuration broadcast messages. By detecting the SC A flag, the MS knows if BS has broadcast new system configuration information. If the flag is set to '1' 1 the MS will try to decode the system configuration broadcast messages in current and subsequent subframes until It has successfully decoded the information. •If MS has detected an SCCC value from the BS that is different from the SCCC value(s) the MS has stored, the MS shall cease UL transmission and attempt to decode system configuration broadcast messages from the BS in the downlink. The MS shall only resume UL transmission after it has successfully decoded the system configuration broadcast messages that contain the SCCC value. •To support power saving for MS in normal/active mode: •If MS has detected that SCCC value has not changed and SCCA flag is set to '0', the MS does not need to decode the system configuration broadcast messages indicated in the BPCH •If MS has detected that SCCC value has not changed and SCCA flag is set to '1' and if the MS has previously successfully decoded the system configuration broadcast messages with new SCCC value, the MS does not need to decode the system configuration broadcast messages indicated by the BPCH •If MS has detected that SCCC value has not changed and SCCA flag is set to '1' and if the MS has not previously successfully decoded the system configuration broadcast messages with new SCCC value, the MS has to decode the system configuration broadcast messages indicated by the BPCH.

To support power saving for MS in sleep mode or idle mode: BS periodically transmit the system broadcast information. MS in sleep mode or idle mode wakes up periodically (with period configured by the BS) to attempt to decode the SCCC/SCCA sent in the superframe configuration control information. The wake-up time of the MS should co-inside with the time when the SCCC and SCCA is broadcast by the BS. If the MS detects that SCCC has changed and the value is not the same as what it stores in the memory the MS shall be awake in this subframe and subsequent sub-frames to decode DPCH and the system broadcast information until it has successfully decode system configuration broadcast messages from the BS that contains the SCCC value. If the MS detects that SCCC has not changed but SCCA flag is set to '1' and the MS has not previously received system configuration broadcast messages from BS that contains a new SCCC value, the MS shall be awake in this subframe and subsequent sub-frames to decode BPCH and the system broadcast information until it has successfully decode system configuration broadcast messages from the BS that contains a new SCCC value If the MS detects that SCCC has not changed and SCCA flag is set to '0', the MS can go back to sleep (if it is in sleep window or paging unavailable interval) without the need to decode the subsequent sub-frames.

INITIAL NETWORK ENTRY PROCEDURE AT MS

There are two methods for MS network entry procedures which correspond to the two options for the type (1) in Table 1.1. Method 1 is based on option (1 a) of type (1) information: MS synchronizes with sync channel/preamble. MS decodes information type (1). MS decodes information type (2). MS performs UL ranging procedure based on the ranging region information given in information type (2). MS obtains type (3) and type (4) information through unicast signaling from the BS, transmitted on DL PHY sub-frames.

Method 2 based on option (1b) of type (1) information: MS synchronizes with sync channel/preamble. MS decodes information type (2) and obtain the ranging region information. MS performs UL ranging procedure based on the ranging region information given in information type (2). BS detects the MS ranging attempt, and BS transmits the information type (1). MS decodes the information type (1). MS continues the ranging procedure. MS obtains type (3) and type (4) information through unicast signaling from the BS, transmitted on the DL PHY frames.

MULTI-CARRIER SUPPORT

In the case of contiguous spectrum, multi-carrier mode is used to support MSs with different bandwidth capability. For example, a 10 MHz spectrum can be divided into two 5 MHz carriers in order to simultaneously' support MSs with 5 MHz bandwidth capability and 10 MHz bandwidth capability. Not all the carriers need to carryall the system broadcast information as system-wide and sector-wide system Information are common to all carriers. Repeating the information over multiple carriers increases the overhead. Two types of carriers can be defined: e Primary carrier: this is a carrier that carries the synchronization channel (or preamble), all the system information, neighbor BS information, paging information and resource allocation/control information, i.e information type (1) to type (7) described in slides 3-5. Secondary carrier: this is a carrier that carries a subset of the system information, i.e, information type (2) for information related to superframe configuration on that carrier; as wen as the resource allocation/control information of each sub-frame within the carrier, i.e. type (7). This type of carrier may also carry the synchronization channel (or preamble).

One or multiple carriers within the spectrum can be designated as primary carriers. One or multiple carriers within the spectrum can be designated as secondary carriers. A narrow-band MS, i.e. an MS that has bandwidth capability to transmit/receive on only one carrier at a time, is assigned for a primary carrier. A wide band MS, i.e., an MS that has bandwidth capability to transmit/receive on multiple carriers at a time, is assigned to one or multiple primary carriers. A wideband MS monitors only the assigned primary carrier(s) for system broadcast information, i.e. type (1) to type (6), and resource allocation/control information, i.e. type (7), for new traffic packet transmission. The wideband MS also monitors secondary carrier(s) for superframe configuration broadcast information, i.e. type (2) at the superframe boundary. The MS may monitor the resource allocation/control information, i.e. type (7), on secondary carrier(s) for HARQ retransmissions. Details of HARQ ACK/NAK and retransmission for multi-carrier operation is given in other appendices.

Overview of Current Draft 802.16M

FIGS. 7-13 of the present application correspond to FIGS. 1-7 of IEEE 802.16m-08/003r1.

The description of these figures in of IEEE 802.16m-08/003r1 is incorporated herein by reference.

The above-described embodiments of the present application are intended to be examples only. Those of skill in the art may effect alterations, modifications and variations to the particular embodiments without departing from the scope of the application.

The invention claimed is:

1. A method in a mobile station, the method comprising:
    establishing communication in a multi-carrier wireless communication system using a primary carrier;
    receiving a first downlink control signaling via the primary carrier, the first downlink control signaling assigning at least one secondary carrier, the secondary carrier being different from the primary carrier;
    transmitting a channel quality indication via the primary carrier using an uplink control channel, the channel quality indication corresponding to the secondary carrier;
    receiving timing information corresponding to the primary carrier; and
    transmitting uplink data via the secondary carrier, the timing of the uplink transmission based on the timing information corresponding to the primary carrier.

2. The method of claim 1, wherein the primary carrier corresponds to the carrier used for network entry.

3. The method of claim 1, wherein the primary carrier contains a synchronization channel.

4. The method of claim 1, further comprising receiving a second control signaling via the primary carrier, the second control signaling changing the primary carrier.

5. The method of claim 4, wherein both primary carriers are associated with the same base station.

6. The method of claim 1, further comprising receiving a message assigning the control channel.

7. The method of claim 1, wherein the multi-carrier wireless communication system employs orthogonal frequency division multiplexing.

8. An apparatus comprising:
a transceiver; and
a processor configured to:
establish communication in a multi-carrier wireless communication system using a primary carrier;
receive a first downlink control signaling via the primary carrier, the first downlink control signaling assigning at least one secondary carrier, the secondary carrier being different from the primary carrier;
transmit a channel quality indication via the primary carrier using an uplink control channel, the channel quality indication corresponding to the secondary carrier;
receive timing information corresponding to the primary carrier; and
transmit uplink data via the secondary carrier, the timing of the uplink transmission based on the timing information corresponding to the primary carrier.

9. The apparatus of claim 8, wherein the primary carrier corresponds to the carrier used for network entry.

10. The apparatus of claim 8, wherein the primary carrier contains a synchronization channel.

11. The apparatus of claim 8, the processor further configured to receive a second control signaling via the primary carrier, the second control signaling changing the primary carrier.

12. The apparatus of claim 11, wherein both primary carriers are associated with the same base station.

13. The apparatus of claim 8, the processor further configured to receive a message assigning the control channel.

14. The apparatus of claim 8, wherein the multi-carrier wireless communication system employs orthogonal frequency division multiplexing.

15. A non-transitory machine-readable medium with a set of instructions stored thereon, which when executed, cause a processor to perform operations comprising:
establishing communication in a multi-carrier wireless communication system using a primary carrier;
receiving a first downlink control signaling via the primary carrier, the first downlink control signaling assigning at least one secondary carrier, the secondary carrier being different from the primary carrier;
transmitting a channel quality indication via the primary carrier using an uplink control channel, the channel quality indication corresponding to the secondary carrier;
receiving timing information corresponding to the primary carrier; and
transmitting uplink data via the secondary carrier, the timing of the uplink transmission based on the timing information corresponding to the primary carrier.

16. The non-transitory machine-readable medium of claim 15, wherein the primary carrier corresponds to the carrier used for network entry.

17. The non-transitory machine-readable medium of claim 15, wherein the primary carrier contains a synchronization channel.

18. The non-transitory machine-readable medium of claim 15, the operations further comprising receiving a second control signaling via the primary carrier, the second control signaling changing the primary carrier.

19. The non-transitory machine-readable medium of claim 18, wherein both primary carriers are associated with the same base station.

20. The non-transitory machine-readable medium of claim 15, the operations further comprising receiving a message assigning the control channel.

21. The non-transitory machine-readable medium of claim 15, wherein the multi-carrier wireless communication system employs orthogonal frequency division multiplexing.

* * * * *